US006926363B2

(12) United States Patent
Yamashita

(10) Patent No.: US 6,926,363 B2
(45) Date of Patent: Aug. 9, 2005

(54) ANGLE-ADJUSTABLE HINGE

(76) Inventor: Tadanobu Yamashita, 5-5-5, Uenoshibamukogaoka-cho, Sakai-shi, Osaka (JP)

( * ) Notice: Subject to any disclaimer, the term of this patent is extended or adjusted under 35 U.S.C. 154(b) by 0 days.

(21) Appl. No.: 10/793,803

(22) Filed: Mar. 8, 2004

(65) Prior Publication Data

US 2005/0046260 A1 Mar. 3, 2005

(30) Foreign Application Priority Data

Aug. 29, 2003 (JP) ....................................... 2003-307176

(51) Int. Cl.[7] .................................................. B60N 2/02
(52) U.S. Cl. ............................ 297/366; 16/321; 16/354
(58) Field of Search ................................ 297/366, 373, 297/367, 368, 369, 370, 371; 16/354, 321, 319, 239, 235, 231, 232

(56) References Cited

U.S. PATENT DOCUMENTS 3,848,923 A * 11/1974 Dehler ....................... 297/366
3,887,232 A * 6/1975 Dinkel ....................... 297/367
4,133,578 A * 1/1979 Fancy ........................ 297/370
5,138,744 A * 8/1992 Coggon ....................... 16/325
6,565,156 B1 * 5/2003 Yamashita et al. ..... 297/354.12

FOREIGN PATENT DOCUMENTS

JP 59-20118 6/1984

* cited by examiner

*Primary Examiner*—Milton Nelson, Jr.
(74) *Attorney, Agent, or Firm*—Armstrong, Kratz, Quintos, Hanson & Brooks, LLP

(57) ABSTRACT

An angle-adjustable hinge provided with a first arm having a case portion and a second arm connected to the first arm with the case portion as to oscillate around a first axis and having a gear portion. The angle-adjustable hinge is also provided with a wedge-shaped window portion formed on the case portion of the first arm and a floating wedge member, disposed as to move within the wedge-shaped window portion, having one face side as a toothed face to engage with the gear portion and another face side as a contact face to contact a wedge face on an outer side of the wedge-shaped window portion.

8 Claims, 11 Drawing Sheets

ANGLE-ADJUSTABLE HINGE

BACKGROUND OF THE INVENTION

1. Field of the Invention

This invention relates to an angle-adjustable hinge as a joint member with which an angle formed by members on one side and another side can be freely set.

2. Description of the Related Art

A legless chair having a back 15 and a seat 16 as shown in a perspective view of FIG. 1 is provided with a hinge between the back 15 and the seat 16 having angle-adjusting function to adjust an inclination angle of the back 15, namely, an angle-adjustable hinge A.

This conventional hinge is constructed as that a gear and a claw piece of a second arm on another side (the back 15 side) are held in a case portion of a first arm connected to one side (the seat 16 side) to restrict oscillation of the second arm in an extending direction (reclining direction of the back 15) to the first arm by engagement of the claw piece with the gear (refer to Japanese utility model publication No. 59-20118).

In the conventional hinge, the claw piece and teeth of the gear are large, and pitch of the teeth of the gear is rough because force working between the first arm and the second arm (force necessary to restrict the oscillation) is to be very large to support man's weight. That is to say, the claw piece and the gear can not be small because of necessary strength.

Therefore, the case portion for storing the claw piece and the gear becomes large, number of the teeth of the gear is small (the pitch is large), and fine adjustment is impossible for small number of angle change stages.

It is an object of the present invention to provide an angle-adjustable hinge with which the number of angle change stages is made large and the entire hinge is made small with small components.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
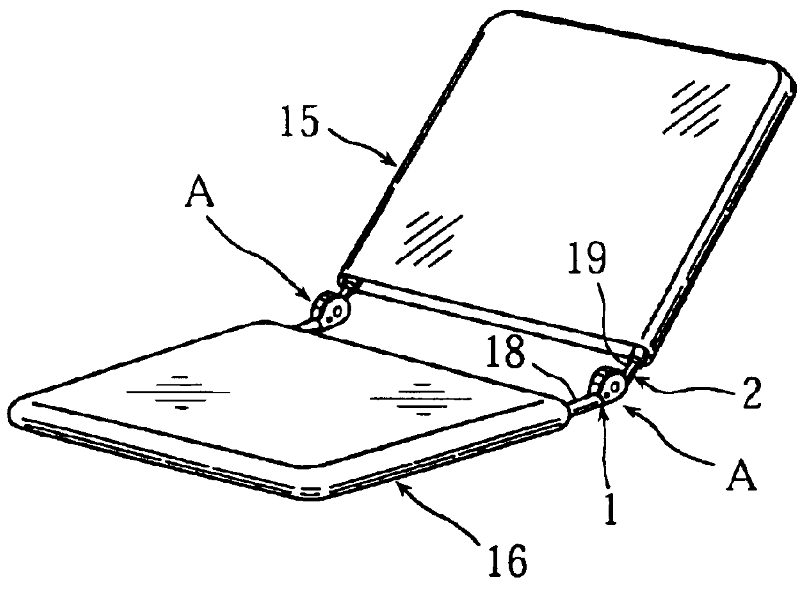
FIG. 1 is a perspective view of a legless chair having angle-adjustable hinges of the present invention.

An angle-adjustable hinge relating to the present invention is, for example, in a legless chair having a back 15 and a seat 16 as shown in a perspective view of FIG. 1, disposed between the back 15 and the seat 16 to adjust inclination angle of the back 15. That is to say, this angle-adjustable hinge A is a joint hinge (connecting hinge) having angle-adjusting function. The hinge A can be used for a sofa, a head rest, a foot rest, etc. other than the legless chair, assembled with two oscillating members, and also used for shelves of which doors are opened and closed by oscillation.

Figure 2:
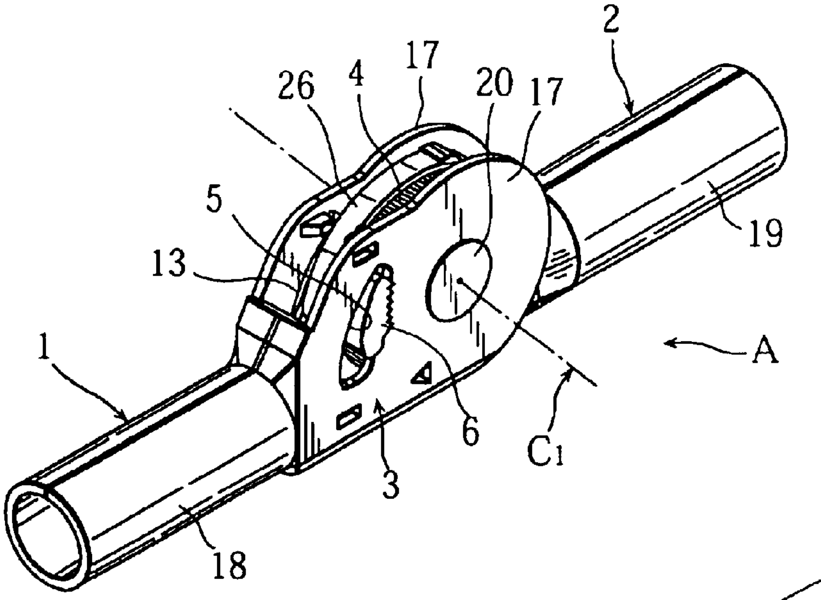
FIG. 2 is a perspective view of the angle-adjustable hinge.
Figure 3:
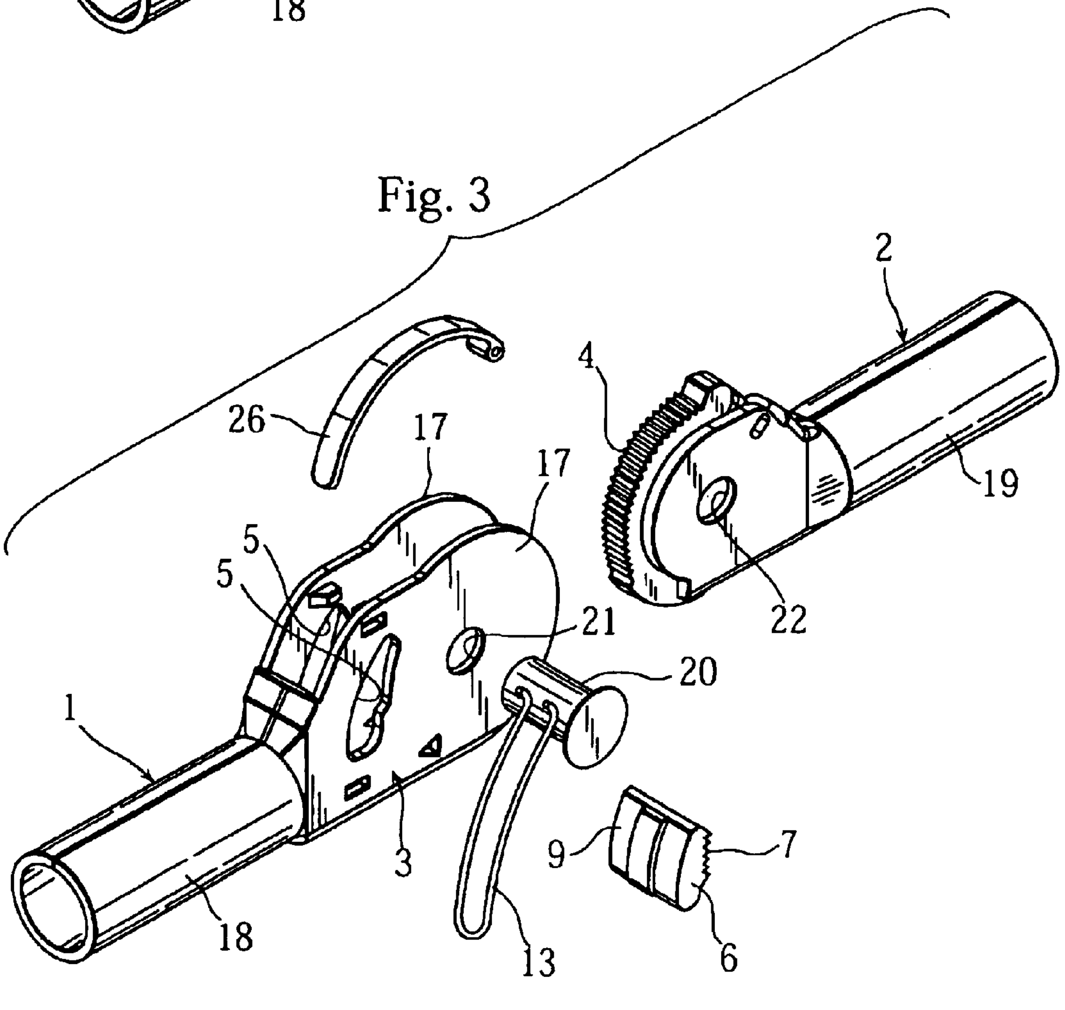
FIG. 3 is an exploded perspective view of the angle-adjustable hinge.

FIG. 2 is a perspective view of the angle-adjustable hinge A, and FIG. 3 is an exploded perspective view of the same.

The angle-adjustable hinge A of the present invention is provided with a first arm 1 provided with a case portion 3 and a second arm 2, connected to the first arm 1 as to oscillate around a first axis $C_1$ by the case portion 3 and provided with a gear portion 4 of which center is the first axis $C_1$. That is to say, the first arm 1 and the second arm 2 are connected as to mutually oscillate around the first axis $C_1$ as the center.

The first arm 1 has the case portion 3 having a pair of wall portions 17 facing each other, and a first attachment portion 18 extended from the case portion 3. The first attachment portion 18 has a cylindrical configuration in FIG. 1 to be inserted for fixation.

And, the second arm 2 has the gear portion 4 stored in the above case portion 3, and a second attachment portion 19 extended from the gear portion 4. The second attachment portion 19 has a cylindrical configuration in FIG. 1 to be inserted for fixation.

The gear portion 4 is formed along an arc line of which center is the first axis $C_1$, and having gear (teeth) within a range (of 100 to 120°) over a quarter circle (90°) slightly (10 to 30°) as shown in FIG. 3. The first and the second attachment portions 18 and 19 may be connected with bolts or have other configurations.

And, in FIG. 1, a frame of the seat 16 is attached to the first attachment portion 18 of the first arm 1, a frame of the back 15 is attached to the second attachment portion 19 of the second arm 2, the back 15 oscillates in respect to the seat 16, and the back 15 is reclined and held with a desired inclination angle.

The connection of the first arm 1 and the second arm 2 is made with a shaft member 20 as shown in FIG. 2 and FIG. 3. A through hole 21 is formed on a central portion of each of the wall portions 17 of the case portion 3 of the first arm 1, a through hole 22 of which center is the first axis $C_1$ is formed on the gear portion 4 of the second arm 2, and the shaft member 20 is inserted to the through holes 21 and 22 as the wall portions 17 surround the gear portion 4 to let the first and the second arms 1 and 2 oscillate around the first axis $C_1$.

Further, the angle-adjustable hinge A is provided with a wedge-shaped window portion 5 formed on the case portion 3 of the first arm 1. The wedge-shaped window portion 5 is formed on each of the wall portions 17 of the case portion 3 as to have the same configuration and penetrate the case portion 3.

Figure 4:
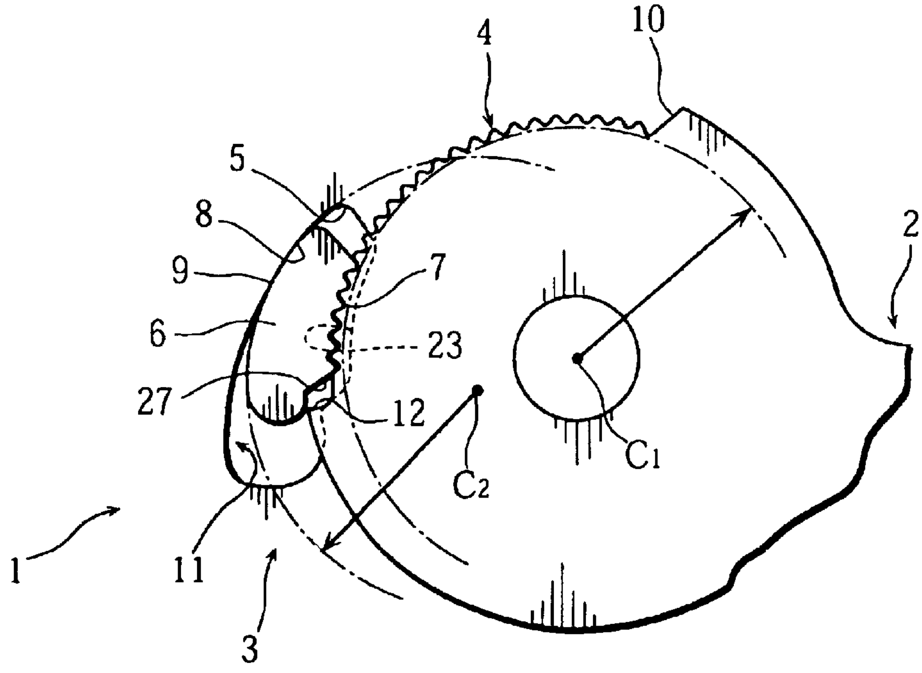
FIG. 4 is an explanatory view of a floating wedge member, a gear portion, and a wedge-shaped window portion.

FIG. 4 is an explanatory view of a principal portion of the angle-adjustable hinge A. The wedge-shaped window portion 5 is a through hole formed arc-shaped to be concave to the first axis $C_1$ side, an arc-shaped wedge face 8, on a position outer to the gear portion 4, is formed on an outer side face of the through hole when the first axis $C_1$ is on the center side, and an arc face 23, of which center is the first axis $C_1$ and smaller than the gear portion 4, is formed on an inner side face. Therefore, the teeth of the gear portion 4 are observed through the wedge-shaped window portion 5.

The wedge face 8 is formed arc-shaped of which center is a second axis $C_2$ eccentric to the first axis $C_1$. When the first arm 1 is on the left side and the second arm 2 is on the right side as shown in FIG. 4, the wedge-shaped window portion 5 becomes a wedge-shaped hole diminishing to clockwise direction, namely, the wedge face 8 approaches the gear portion 4.

A space is formed between the wedge face 8 and a peripheral toothed face of the gear portion 4, and a later-described floating wedge member 6 is disposed in the space.

Further, the angle-adjustable hinge A is provided with the floating wedge member 6 which is disposed movably within the wedge-shaped window portion 5, of which one face (an inner side face) is a toothed face 7 to engage with the gear portion 4, and another face (an outer side face) is a contact face 9 to contact the wedge face 8.

The contact face 9 has a radius of curvature (approximately) similar to that of the wedge face 8. On the toothed face 7, plural teeth are formed on a face identical to a pitch face of the gear portion 4, and all of the teeth engage with the gear portion 4 at the same time.

Width dimension of the floating wedge member 6 is approximately same as that of the case portion 3. Therefore, both of edge faces of the contact face 9 of the floating wedge member 6 can contact the wedge face 8 of the wedge-shaped window portion 5 (the side walls 17).

And, number of the teeth of the gear portion 4 of the second arm 2 is 12 to 24 for a quarter circle (90°) of the gear portion 4, number of the teeth of the toothed face 7 of the floating wedge member 6 is 3 to 9. In FIG. 4, the number of the teeth of the gear portion 4 is 18 for the quarter circle, the teeth are formed within a range of 110°, and the number of the teeth is 22 in all. And, the number of the teeth of the floating wedge member 6 is 6.

That is to say, the teeth of the gear portion 4 and the floating wedge member 6 are set to have a 5° pitch.

The case portion 3 of the first arm 1 has an elastic member 13 to elastically push the floating wedge member 6 to the gear portion 4 of the second arm 2. The elastic member 13 is a spring member formed with a steel wire bent U-shaped, of which both ends are fixed to the case portion 3 between the wall portions 17 and a central portion contacts a central area of the contact face 9 of the floating wedge member 6, and elastically pushing the floating wedge member 6 to the gear portion 4.

Figure 5A:
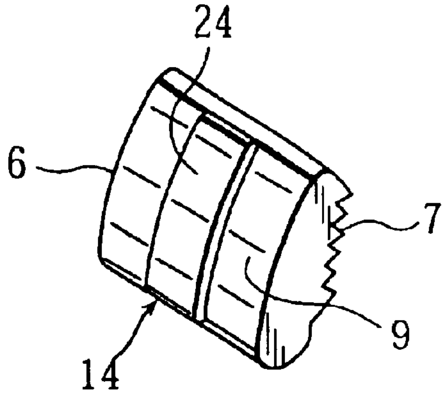
FIG. 5A is an explanatory view of falling-prevention means of the floating wedge member.
Figure 5B:
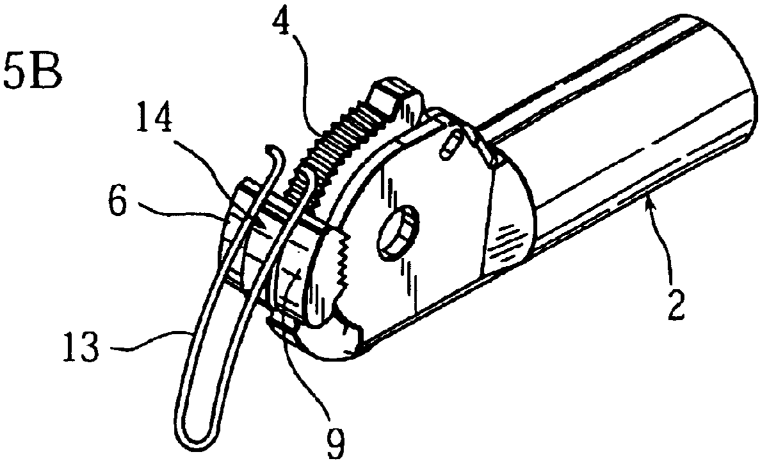
FIG. 5B is an explanatory view of the falling-prevention means of the floating wedge member.

And, the floating wedge member 6 has a falling-prevention means to prevent falling out of the window portion 5 because the floating wedge member 6 is disposed movably within the wedge-shaped window portion 5. FIGS. 5A and 5B are explanatory views of the falling-prevention means. To describe the falling-prevention means concretely, a hitching portion 14, hitching to the elastic member 13 to prevent falling out of the wedge-shaped window portion 5, is formed on the floating wedge member 6.

The hitching portion 14 is, as shown in FIG. 5A, a rising portion 24 formed higher than the contact face 9 of the floating wedge member 6 for one stage, and two wire portions of the elastic member bent to be U-shaped hold the rising portion 24 as shown in FIG. 5B.

Figure 6A:
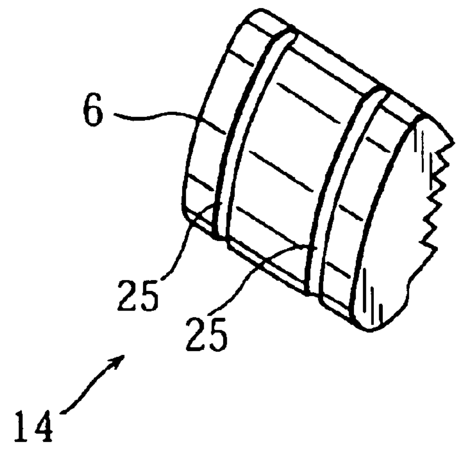
FIG. 6A is an explanatory view of another embodiment of the falling-prevention means of the floating wedge member.
Figure 6B:
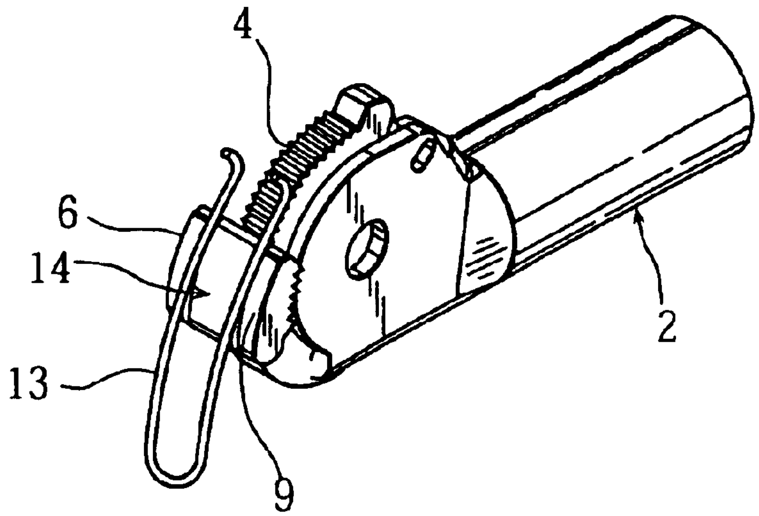
FIG. 6B is an explanatory view of another embodiment of the falling-prevention means of the floating wedge member.

FIGS. 6A and 6B are explanatory views of another embodiment of the falling-prevention means. Two concave grooves 25 are formed on the contact face 9 as the hitching portion 14 as shown in FIG. 6A, and two wire portions of the elastic member bent to be U-shaped fit to the concave grooves 25 as shown in FIG. 6B.

With the constructions described above, the hitching portion 14 hitches to the elastic member 13 fixed to the case portion 3 to prevent the floating wedge member 6 from falling out of the wedge-shaped window portion 5.

Further, although not shown in Figures, as still another falling-prevention means, a lid member of thin plate may be attached to both of the outer sides of the case portion 3 to cover the wedge-shaped window portions 5. In this case, the lid member is constructed as to insert and hold the shaft member 20 (refer to FIG. 3).

And, as shown in FIG. 2 and FIG. 3, a cover 26 to prevent foreign matter intrusion is attached to the case portion 3. The cover 26 is disposed between the wall portions 17 as to cover the gear portion 4 and the floating wedge member 6 engaged with the gear portion 4 to prevent the floating wedge member 6 from being stuck by the foreign matter intrusion.

Next, angle-adjusting function of the first arm 1 and the second arm 2, oscillating for folding and opening movement, is described.

FIGS. 7 through 11 are front views of the angle-adjustable hinge A to explain the movement in which the wall portion 17 on one side (the front side) of the case portion 3 is partially vanished (omitted) for explanation.

And, FIGS. 12A through 13C are front views of a principal portion to explain the movements of the gear portion 4 and the floating wedge member 6 within the wedge-shaped window portion 5.

Figure 8:
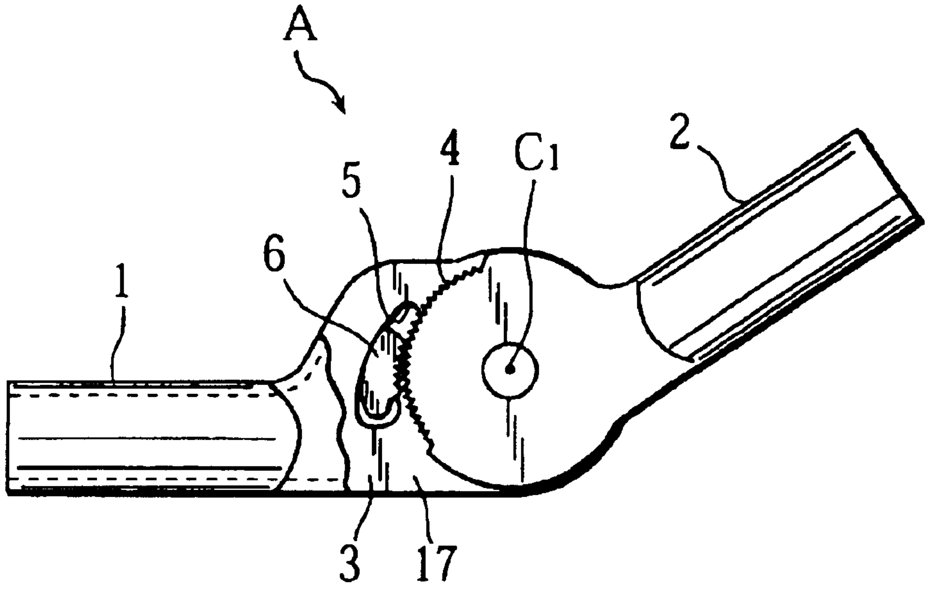
FIG. 8 is a front view of the angle-adjustable hinge in a desired inclination angle.
Figure 9:
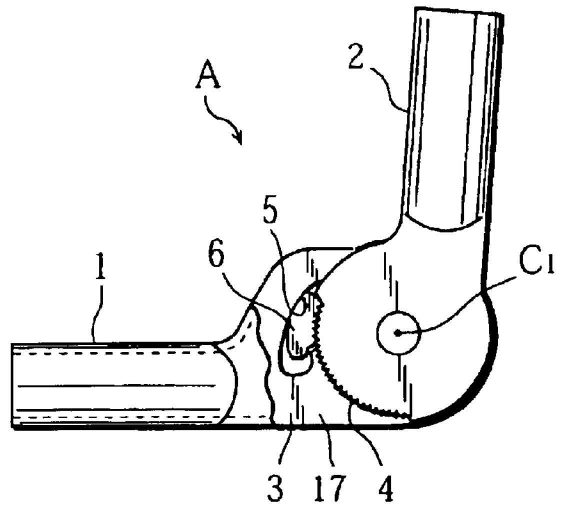
FIG. 9 is a front view of the angle-adjustable hinge in full-folded state.

In a full-extended state (FIG. 7) in which the first arm 1 and the second arm 2 are apart, namely, the first arm 1 and the second arm 2 form a straight line (in phase of 180°), the second arm 2 gradually oscillates around the first axis $C_1$ and become folded (inclined) to make a desired folding angle with the first arm 1 (FIG. 8), and the first arm 1 and the second arm 2 become a full-folded state in which the arms 1 and 2 form approximately right angle (FIG. 9).

Figure 7:
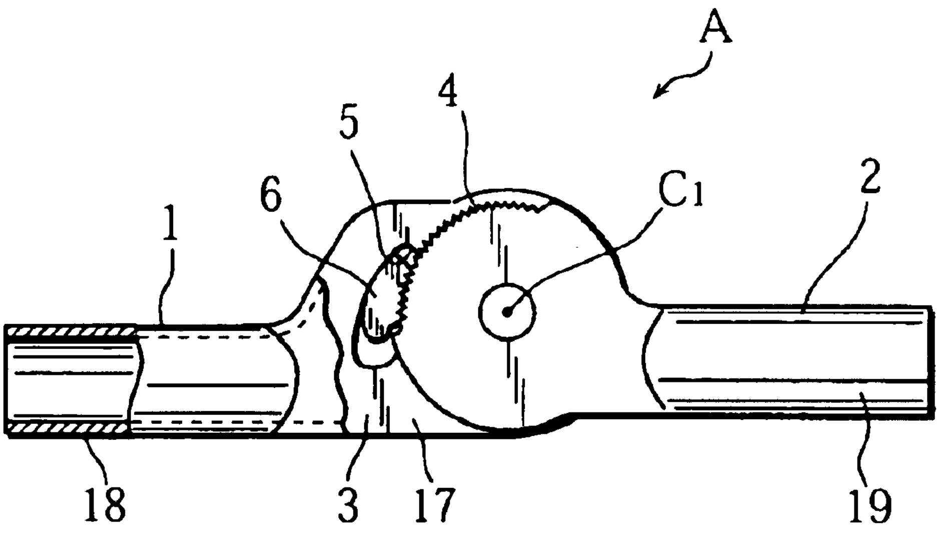
FIG. 7 is a front view of the angle-adjustable hinge in full-extended state.
Figure 12A:
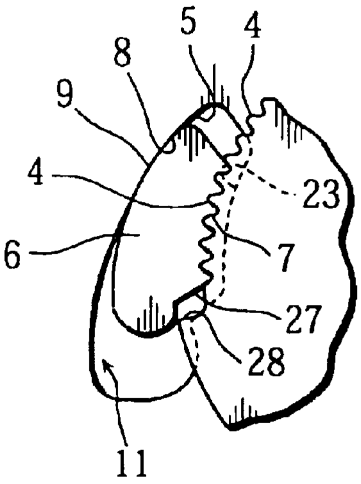
FIGS. 12A through 12C are front views of a principal portion to explain angle-setting movement from the full-extended state.

To describe with reference to FIGS. 12A through 13C, in FIG. 12A corresponding to the state of FIG. 7, the floating wedge member 6 engages with the gear portion 4 and contacts the wedge face 8, and the second arm 2 does not oscillate clockwise beyond the state in FIG. 7 (the second arm 2 is locked).

Figure 12B:
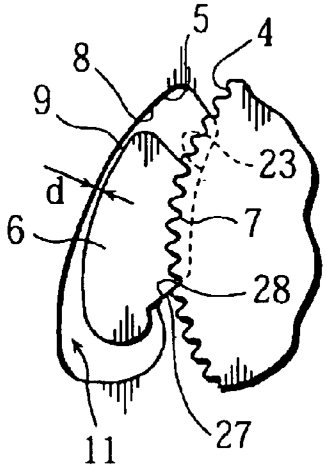
Figure 12C:
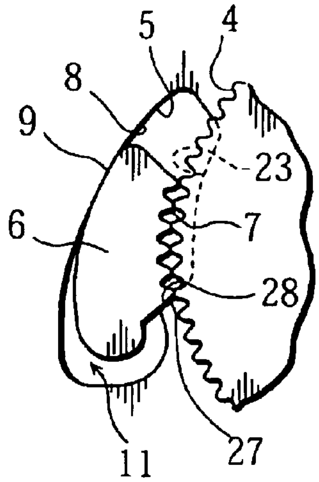

In this state, the contact face 9 of the floating wedge member 6, elastically pushed by the elastic member 13 (refer to FIG. 5) toward the gear portion 4 to engage, is parted from the wedge face 8 of the window portion 5 to make a slight gap d with the wedge face 8 as shown in FIG. 12B when the second arm 2 is oscillated in standing direction as shown in FIG. 8. And, a guiding slope (staged face) 27 of the floating wedge member 6 is made in contact with a staged portion 28 of the window portion 5 by the standing movement of the second arm 2 as shown in FIG. 12C, the toothed face 7 of the floating wedge member 6 can be parted from the gear portion 4 for the gap d, and the toothed face 7 of the floating wedge member 6 can go over the gear portion 4 with clicking sound.

The guiding slope 27 of the floating wedge member 6 is formed on a rear end portion of the toothed face 7 of the floating wedge member 6, and the staged portion 28 of the wedge-shaped window portion 5 is formed on the arc face 23 on an inner side of the wedge-shaped window portion 5 as to contact the slope 27.

Therefore, the floating wedge member 6 restricts the second arm 2 not to oscillate in the extending direction toward the first arm 1 by wedge function of the floating wedge member 6, of which the toothed face 7 engages with the gear portion 4 and the contact face 9 contacts the wedge face 8, held between the gear portion 4 and the wedge face 8.

That is to say, the first arm 1 and the second arm 2 can be maintained as to form a desired folding angle (inclination angle).

Figure 13A:
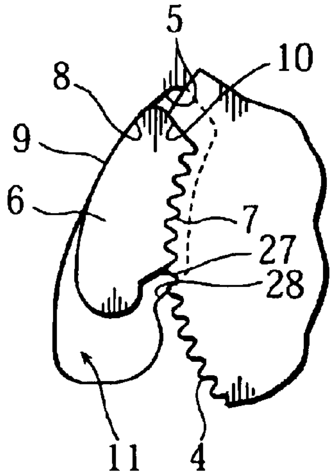
FIGS. 13A through 13C are front views of the principal portion to explain returning movement of the second arm from the full-folded state in the extending direction.

And, as shown in FIG. 13A, the second arm 2 has a push-back protrusion 10 to push the floating wedge member 6 in the folding direction when the second arm 2 oscillates toward the first arm 1 beyond a predetermined folding angle to become the full-folded state (FIG. 9).

The push-back protrusion 10 is formed on an end portion side of the gear portion 4 (toothed portion) to contact the front end portion of the toothed face 7 of the floating wedge member 6.

Figure 10:
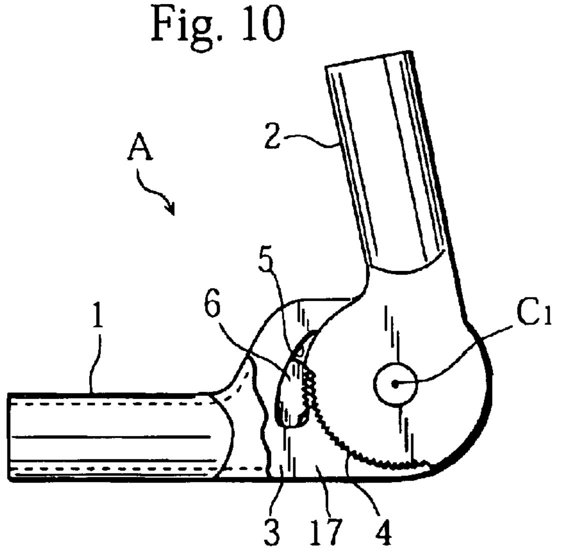
FIG. 10 is a front view of the angle-adjustable hinge in angle retension release state.
Figure 13B:
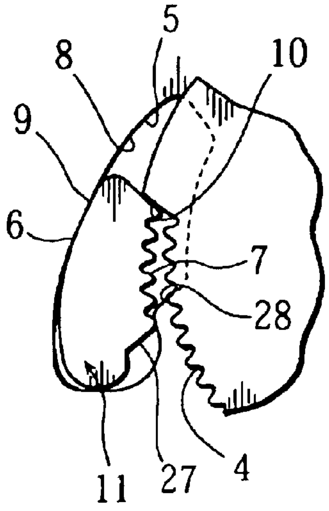

And, as shown in FIG. 10 and FIG. 13B, when the second arm 2 in the full-folded state is oscillated further in the folding direction, the floating wedge member 6 (the guiding slope 27), pushed-back by the push-back protrusion 10, goes over the staged portion 28 and becomes stored in the retreat space 11 to release the engagement of the gear portion 4 and the toothed face 7 of the floating wedge member 6. That is to say, the floating wedge member 6 stored in the retreat space 11 is parted from the gear portion 4.

Figure 11:
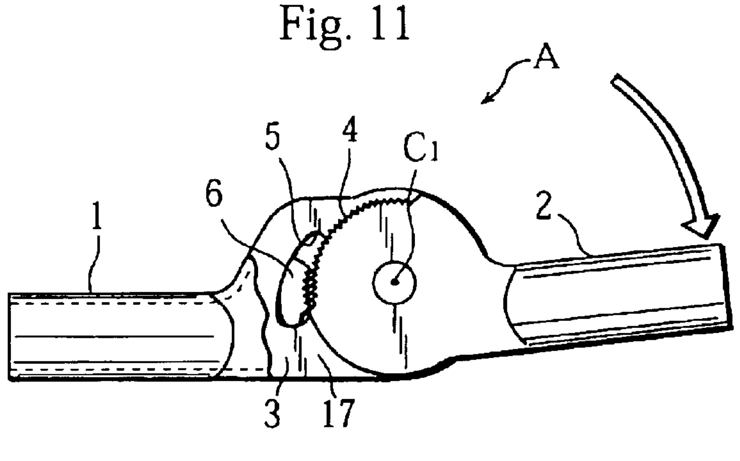
FIG. 11 is a front view of the angle-adjustable hinge in a state in which a second arm is returned to the extending direction.

Therefore, the second arm 2 becomes free (freely oscillatable) in respect of the first arm 1, freely oscillatable in the extending direction as shown in FIG. 11, and returnable to the full-extended state in FIG. 7.

Figure 13C:
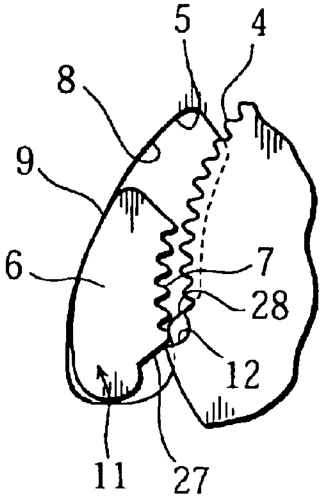

And, the second arm 2 has a pushing protrusion 12 to push the floating wedge member 6 stored in the retreat space 11 to engage the toothed face 7 with the gear portion 4 as shown in FIG. 13C when the second arm 2 is oscillated to the full-extended state of the predetermined angle (180°) to the first arm 1.

The pushing protrusion 12 is formed on another end portion side (opposite to the end portion side on which the push-back protrusion 10 is formed) of the gear portion 4. When the full-extended state is achieved, the protrusion 12 pushes the guiding slope 27 of the floating wedge member 6 to push the floating wedge member 6 out of the retreat space 11 and return to the state of FIG. 12A.

Therefore, the movement of the floating wedge member 6 within the wedge-shaped window portion 5 is as follows. From the full-extended state to the full-folded state, the floating wedge member 6 is held by the gear portion 4 and the wedge face 8 to adjust and maintain the desired folding angle (inclination angle) of the first arm 1 on the wedge face 8 side and the second arm 2 on the gear portion 4 side. Beyond the full-folded state, the floating wedge member 6 is pushed by the push-back protrusion 10 and stored in the retreat space 11 in the wedge-shaped window portion 5 to make the first arm 1 and the second arm 2 freely oscillatable.

Then, when returned to the full-extended state, the floating wedge member 6 is pushed-out of the retreat space 11 by the pushing protrusion 12 and becomes engaged again with the gear portion 4.

Figure 17:
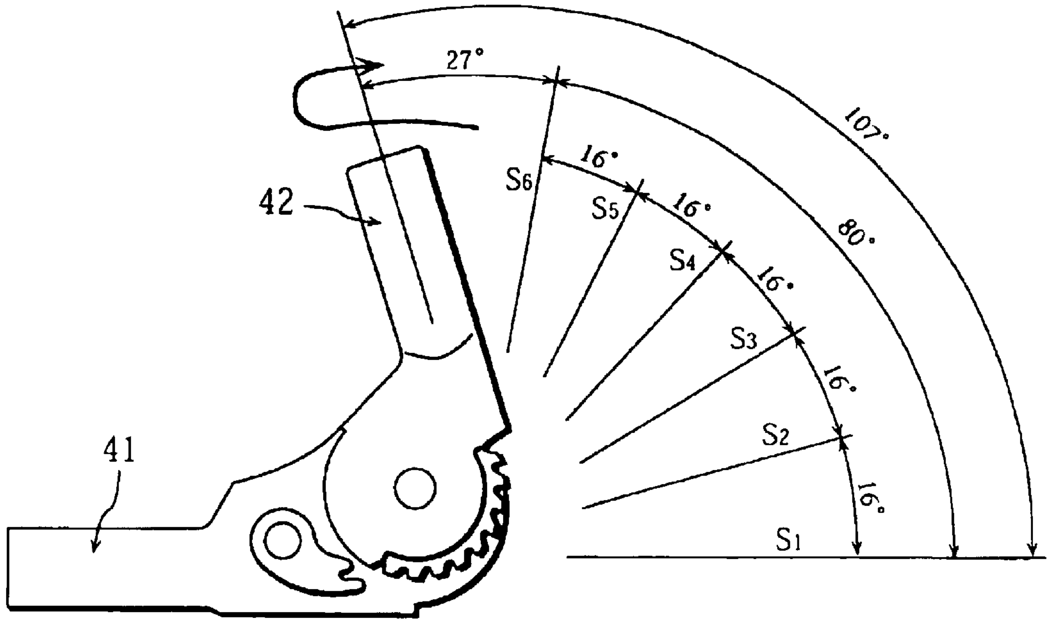
Fig. 17 PRIOR ART
FIG. 17 is an explanatory view of angle adjustment of a conventional angle-adjustable hinge.

As shown in an explanatory view of FIG. 17, in a conventional hinge, to return a first arm 41 and a second arm 42 from a folded state to a full-extended state, it is necessary to greatly oscillate further the second arm 42 in a full-folded state (inclined at 80°). In FIG. 7, the second arm 42 have to be oscillated further for 27°.

Figure 16:
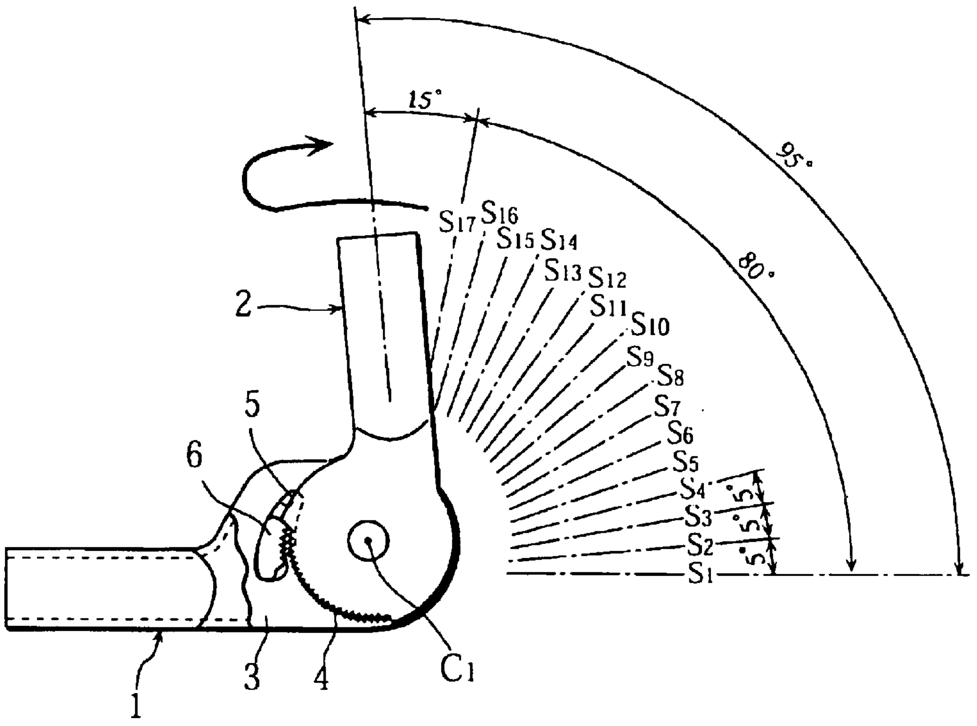
FIG. 16 is an explanatory view of angle-adjusting function of the present invention.

On the contrary, in the hinge A of the present invention as shown in FIG. 16, the second arm 2 is oscillated only for a small oscillation angle (about 15°) from the full-folded state (inclined at 80°) to make the second arm 2 fully extended because the pitch of the teeth of the gear portion 4 is small, and the engagement with the gear portion 4 is released only by the movement of the floating wedge member 6 within the wedge-shaped window portion 5.

That is to say, in the legless chair as shown in FIG. 1, the back 15 can not be returned to horizontal state without a large forward bend (of 17° from the vertical line) with the conventional hinge A, and user's body receives high stress when the angle is changed while the user is sitting in the chair. On the contrary, in the present invention, the back 15 is bent forward slightly (for 5°) to reduce the stress and make the operation comfortable.

And, as shown in FIG. 16, although adjusting pitch of the folding angle (inclination angle) is, for example, 5° in the present invention and the angle can be adjusted from 0° to 80° with 17 stages, the adjusting pitch of the folding angle (inclination angle) of the conventional hinge is 16° and the angle is adjusted from 0° to 80° only with 6 stages.

Figure 14A:
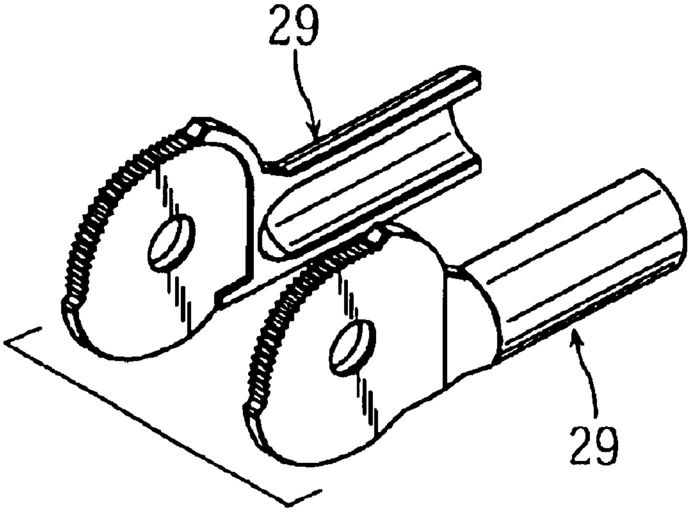
FIG. 14A is a perspective view to explain a construction of the second arm.
Figure 14B:
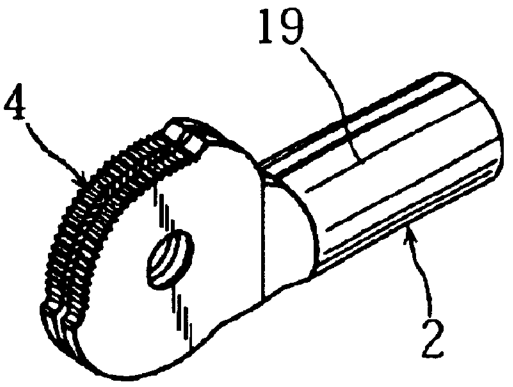
FIG. 14B is a perspective view to explain the construction of the second arm.
Figure 15A:
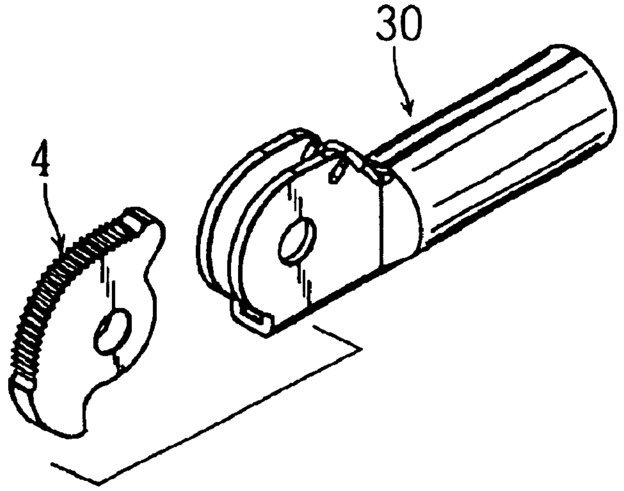
FIG. 15A is a perspective view to explain a construction of the second arm in another embodiment.
Figure 15B:
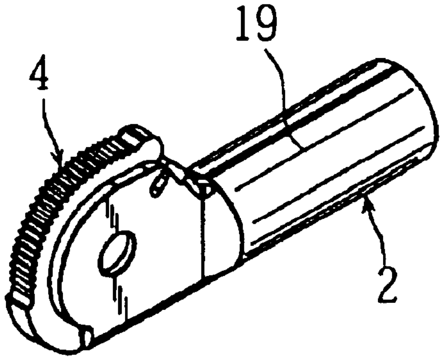
FIG. 15B is a perspective view to explain the construction of the second arm in another embodiment.

Next, to describe the construction of the second arm 2 with explanatory views of FIGS. 14A through 15B, half arm members 29 are made by die plastic work, etc. as shown in FIG. 14A, and then, these are assembled by welding, etc. to compose the second arm 2 as shown in FIG. 14B.

And, the gear portion 4 and an arm portion 30 may be separately made by die plastic work, etc. to be assembled.

And, although not shown in Figures, the second arm 2 may be unitedly formed by die plastic work, etc. (through plural production processes).

And, in the gear portion 4 and the floating wedge member 6 of the present invention, a multi-staged angle-adjustable hinge (a ratchet gear portion) infinitely close to stepless can be composed, keeping the strength, by enlarging the radius of curvature of the pitch circle of the gear with the tooth (a module) remaining as it is.

And, a more compact multi-staged angle-adjustable hinge A can be obtained by making the module smaller than that shown in Figures.

According to the angle adjustable hinge of the present invention, the both of the first arm 1 and the second arm 2 never oscillate in the extending direction because the contact face 9 on the outer side of the floating wedge member 6 contacts the wedge face 8 of the wedge-shaped window portion 5 and pressing force toward the center of the gear portion 4 works through the floating wedge member 6 engaging with the gear portion 4 when the first arm 1 and the second arm 2 are about to oscillate in the extending direction, with the construction in which the first arm 1 is provided with the case portion 3, the second arm 2 is connected to the first arm 1 as to oscillate around the first axis $C_1$ and provided with the gear portion 4, the wedge-shaped window portion 5 is formed on the case portion 3 of the first arm 1, and the floating wedge member 6, disposed movably within the wedge-shaped window portion 5, of which one face side is the toothed face 7 to engage with the gear portion 4 and another face side is the contact face 9 to contact the wedge face 8 on the outer side of the wedge-shaped window portion 5 to restrict the second arm 2 to oscillate in the extending direction with respect to the first arm 1.

And, the tooth (module) of the gear portion 4, in spite of its small size, can receive high load and have sufficient strength because the oscillation is restricted not only by hitching of the gear portion 4 but by contact force of the floating wedge member 6 to the wedge face 8, the engagement of the gear portion 4, and the pressing force. And, the number of the teeth on the gear portion 4 can be increased by making the tooth of the gear portion 4 small to increase the number of angle-adjusting stages. Therefore, the pitch of the folding angle becomes small for fine adjustment. That is to say, the back 15 of comfortable inclination angle is obtained when the hinge is applied to chairs and sofas.

Further, the whole hinge can be made small by the small composition of the case portion 3, and a cover of a chair or a sofa is not damaged when the hinge A is disposed inside the cover.

And, the engagement with the gear portion 4 is released and re-engaged by the movement of the floating wedge member 6 within the wedge-shaped window portion 5 to greatly facilitate the angle-adjusting movement of the first arm 1 and the second arm 2 because the second arm 2 has the push-back protrusion 10 to push the floating wedge member 6 in the folding direction when the second arm 2 oscillates to the first arm 1 over a predetermined folding angle, the wedge-shaped window portion 5 has the retreat space 11 for storing the floating wedge member 6 pushed-back by the push-back protrusion 10 to release the engagement of the toothed face 7 and the gear portion 4, and the second arm 2 has the pushing protrusion 12 for pushing the floating wedge member 6 stored in the retreat space 11 to make the toothed face 7 engage with the gear portion 4 when the second arm 2 is oscillated to open with respect to the first arm 1.

And, malfunction and breaking of the floating wedge member 6 in use is eliminated to permanently keep the performance because the case portion 3 of the first arm 1 has the elastic member 13 to elastically push the floating wedge member 6 in a direction toward the gear portion 4 of the second arm 2, and the hitching portion 14, hitching to the elastic member 13 to prevent the floating wedge member 6 from falling out of the wedge-shaped window portion 5, is formed on the floating wedge member 6.

And, effective wedge function is shown, and the movement of the floating wedge member 6 and the engage-release movement with the gear portion 4 is made smooth because the gear portion 4 is formed to have the first axis $C_1$ as the center, and the wedge face 8 of the wedge-shaped window portion 5 is formed arc-shaped of which center is the second axis $C_2$ eccentric to the first axis $C_1$.

And, the number of angle-adjusting stages is increased, and high load working on the first arm and the second arm 2 is stably received because the number of the teeth of the gear portion 4 of the second arm 2 is 12 to 24 for a quarter circle of the gear portion 4, and the number of the teeth of the toothed face 7 of the floating wedge member 6 is 3 to 9.

While preferred embodiments of the present invention have been described in this specification, it is to be understood that the invention is illustrative and not restrictive, because various changes are possible within the spirit and indispensable features.

What is claimed is:

1. An angle-adjustable hinge comprising:

a first arm provided with a case portion;

a second arm connected to the first arm with the case portion as to oscillate around a first axis and provided with a gear portion;

a wedge-shaped window portion formed on the case portion of the first arm; and a floating wedge member, disposed movably within the wedge-shaped window portion, of which one face side is a toothed face to engage with the gear portion and another face side is a contact face to contact a wedge face on an outer side of the wedge-shaped window portion to restrict the second arm to oscillate in an extending direction with respect to the first arm.

2. The angle-adjustable hinge as set forth in claim 1, wherein the second arm has a push-back protrusion to push the floating wedge member in a folding direction when the second arm oscillates to the first arm over a predetermined folding angle, the wedge-shaped window portion has a retreat space for storing the floating wedge member pushed-back by the push-back protrusion to release the engagement of the toothed face and the gear portion, and the second arm has a pushing protrusion for pushing the floating wedge member stored in the retreat space to make the toothed face engage with the gear portion when the second arm is oscillated to open with respect to the first arm.

3. The angle-adjustable hinge as set forth in claim 1 or claim 2, wherein the gear portion is formed to have the first axis as a center, and the wedge face of the wedge-shaped window portion is formed in an arc-shape of which center of the wedge face has a second axis eccentric to the first axis.

4. The angle-adjustable hinge as set forth in claim 1 or claim 2, wherein a number of the teeth of the gear portion of the second arm is 12 to 24 for a quarter circle of the gear portion and a number of the teeth of the toothed face of the floating wedge member is 3 to 9.

5. The angle-adjustable hinge as set forth in claim 1 or claim 2, wherein the case portion of the first arm has an elastic member to elastically push the floating wedge member in a direction toward the gear portion of the second arm, and a hitching portion, hitching to the elastic member to prevent the floating wedge member from falling out of the wedge-shaped window portion, is formed on the floating wedge member.

6. The angle-adjustable hinge as set forth in claim 5, wherein a number of the teeth of the gear portion of the second arm is 12 to 24 for a quarter circle of the gear portion, and a number of the teeth of the toothed face of the floating wedge member is 3 to 9.

7. The angle-adjustable hinge as set forth in claim 5, wherein the gear portion is formed to have the first axis as a center, and the wedge face of the wedge-shaped window portion is formed in an arc-shape of which center of the wedge face has a second axis eccentric to the first axis.

8. The angle-adjustable hinge as set forth in claim 7, wherein a number of the teeth of the gear portion of the second arm is 12 to 24 for a quarter circle of the gear portion, and a number of the teeth of the toothed face of the floating wedge member is 3 to 9.

* * * * *